US007318595B2

(12) United States Patent
Lamela et al.

(10) Patent No.: US 7,318,595 B2
(45) Date of Patent: Jan. 15, 2008

(54) VARIABLE RIDE CONTROL

(75) Inventors: Anthony J. Lamela, Gilberts, IL (US); Troy D. Bateman, Plainfield, IL (US); Brian E. Felsing, Park Ridge, IL (US); Peter J. Dix, Naperville, IL (US); Daniel B. Shore, Prospect Heights, IL (US); Hong-Chin Lin, Portland, OR (US)

(73) Assignee: CNH America LLC, New Holland, PA (US)

( * ) Notice: Subject to any disclaimer, the term of this patent is extended or adjusted under 35 U.S.C. 154(b) by 312 days.

(21) Appl. No.: 10/854,833

(22) Filed: May 27, 2004

(65) Prior Publication Data

US 2005/0275184 A1 Dec. 15, 2005

(51) Int. Cl.
*B60G 17/00* (2006.01)
*B60G 17/019* (2006.01)

(52) U.S. Cl. ......................... 280/124.157; 280/124.16; 280/124.161; 280/5.503; 280/5.515; 280/5.519

(58) Field of Classification Search ............ 280/5.503, 280/5.519, 5.515, 124.157, 124.16, 124.161
See application file for complete search history.

(56) References Cited

U.S. PATENT DOCUMENTS

| | | | | |
|---|---|---|---|---|
| 3,970,327 | A * | 7/1976 | Dezelan | 280/683 |
| 4,230,196 | A * | 10/1980 | Snead | 177/141 |
| 4,602,800 | A * | 7/1986 | Persson | 280/6.156 |
| 5,137,299 | A * | 8/1992 | Jones | 280/5.507 |
| 6,144,907 | A * | 11/2000 | Shibuya et al. | 701/37 |
| 6,202,010 | B1 * | 3/2001 | Shono et al. | 701/37 |
| 7,044,482 | B2 * | 5/2006 | Shore | 280/6.157 |
| 2003/0209379 | A1 * | 11/2003 | Bateman et al. | 180/308 |
| 2004/0195013 | A1 * | 10/2004 | Spark | 180/6.24 |

* cited by examiner

*Primary Examiner*—Paul N. Dickson
*Assistant Examiner*—Timothy Wilhelm
(74) *Attorney, Agent, or Firm*—Michael G. Harms; John William Stader; Patrick M. Sheldrake

(57) ABSTRACT

A skid steer vehicle has a chassis with four drive wheels suspended from the chassis that are damped by four damping cylinders. An electronic controller varies the damping of the cylinders in an automatic mode, based on certain operational parameters of the vehicle, and in a manual mode in response to operator selection of a desired degree of suspension damping.

14 Claims, 4 Drawing Sheets

100 118 120 122 114 102 106 110 101 112 108 104 116

VARIABLE RIDE CONTROL

FIELD OF THE INVENTION

The invention relates generally to skid steer vehicles. More particularly, it relates to skid steer vehicles having damped suspensions. Even more particularly, it relates to systems for damping the oscillations of the suspensions.

BACKGROUND OF THE INVENTION

Skid steer vehicles have recently come on the market with suspensions that permit the chassis to move up and down with respect to the ground. Prior skid steer vehicles were rigidly supported for movement over the ground.

Skid steer vehicles with suspensions are prone to oscillating when driven over rough terrain with changing loads. They have a relatively small wheel base, and as a result, when they are driven over the ground the oscillations of the suspensions can be substantial, depending, among other things, on the vehicle load, the vehicle speed and the terrain over which the vehicle is operating.

What is needed, therefore, is a skid steer vehicle having a system and method for automatically varying the damping of the suspensions based upon operating conditions in an automatic mode of operation. What is also needed is a system and method for automatically varying the damping based on vehicle speed. What is also needed is a system and method for automatically varying the damping based on vehicle load.

Skid steer vehicles are intended for use in a wide variety of applications in many different configurations, however. It is difficult to accommodate all these applications and configurations automatically.

What is also needed is a system and method that permit the operator to manually vary the suspension damping in a manual mode of operation and will permit the operator to select between the mechanical mode of operation and the automatic mode.

It is an object of this application to provide a system or method with these capabilities in at least one embodiment, although not all embodiments described herein may have all these capabilities.

SUMMARY OF THE INVENTION

In accordance with a first aspect of the invention, a skid steer vehicle with variable ride control system includes a chassis; four drive wheels pivotally coupled to the chassis by four control arms, located at the front and the rear of left side and the right side of the vehicle, respectively, wherein said left side wheels are configured to be driven independently from said right side wheels to skid steer the vehicle; four hydraulic damping cylinders coupled to the chassis, wherein each cylinder is disposed to damp the movement of a corresponding one of the four drive wheels; and an electronic controller configured to automatically control the flow of fluid in the four hydraulic damping cylinders in a first automatic mode of operation and to permit the manual control of the flow of fluid on the four hydraulic damping cylinders in a second manual mode of operation.

The skid steer vehicle may include an operator input device coupled to the electronic controller and responsive to operator manipulation to select a desired degree of damping for all four hydraulic damping cylinders. It may also include a manually operable mode switch coupled to the electronic controller, the controller being configured to responsively change the damping of the four hydraulic damping cylinders between an automatic mode and a manual mode. The skid steer vehicle may have a vehicle load sensor, a vehicle speed sensor and a vehicle suspension position sensor coupled to the electronic controller. The electronic controller may be configured to read the load, speed and position sensors and to generate a signal indicative of a desired degree of suspension damping therefrom. The skid steer vehicle may include four variable orifices coupled to the four hydraulic damping cylinders to throttle cylinder hydraulic fluid flow, and the electronic controller may be configured to vary the orifice closure based upon signals received from the load, speed, and position sensors. It may also include four gas-charged accumulators fluidly coupled to the four respective hydraulic damping cylinders, and the orifices may be disposed to throttle the flow of fluid therebetween.

In accordance with a second aspect of the invention, a skid steer vehicle with a variable ride control system may include a chassis, four drive wheels mounted to the chassis and pivotable with respect thereto, with two drive wheels on each side of the chassis such that the wheels on each side can be driven independently of each other to skid steer the vehicle, four hydraulic damping cylinders, each cylinder being coupled to the chassis to damp the motion of a corresponding one of the four drive wheels; and an electronic controller configured to control fluid flow in the four cylinders in an automatic mode in response to vehicle speed, vehicle load and vehicle suspension position, and to control the damping in a manual mode in response to operator selection of a desired degree of damping.

The vehicle may include sensors coupled to the electronic controller that are configured to generate signals indicative of vehicle load, suspension position and vehicle speed, and may include an operator input device coupled to the electronic controller to generate signals indicative of an operator's selected degree of damping. It may also include a means for switching operating modes between the automatic mode and the manual mode. The electronic controller may be configured to throttle fluid flow through four orifices that are coupled (respectively) to the four hydraulic damping cylinders, and to do this in response to the vehicle's speed, the load on the vehicle and the position of a suspension component, such as a control arm, for example. The vehicle may also include four control arms, including two forwardly extending control arms coupled to the chassis on opposite sides of the vehicle and two rearwardly extending control arms coupled to the chassis on opposite sides of the vehicle. Each control arm may support a corresponding one of the drive wheels. The vehicle may further include load, speed and position sensors, and the electronic controller may be configured to read the load, speed and position sensors and to generate a signal indicating a desired orifice position from those sensor signals.

In accordance with a third aspect of the invention, a computer-implemented method for varying the ride of a skid steer vehicle is provided, including the steps of (a) in a first automatic mode of operation, (1) sensing a suspension position of the skid steer vehicle, (2) sensing a speed of the skid steer vehicle, (3) sensing a load on the skid steer vehicle, (4) combining the sensed position, speed and load to provide a computer-variable desired degree of suspension damping, and (5) regulating a suspension component to provide the computer variable desired degree of suspension damping; and (b) in a second manual mode of operation, (1) sensing an operator's manually selected desired degree of suspension damping, and (2) regulating the suspension component to provide the manually selected desired degree of suspension damping.

The step of sensing a load may include a step of sensing a pressure in a hydraulic cylinder. The step of sensing a pressure in a hydraulic cylinder may include the step of sensing a pressure in a loader lift arm cylinder. The method may also include the step of: automatically repeating the steps of (a)(1) through (b)(2), above, at periodic intervals.

DETAILED DESCRIPTION OF THE PREFERRED EMBODIMENTS

Figure 1:
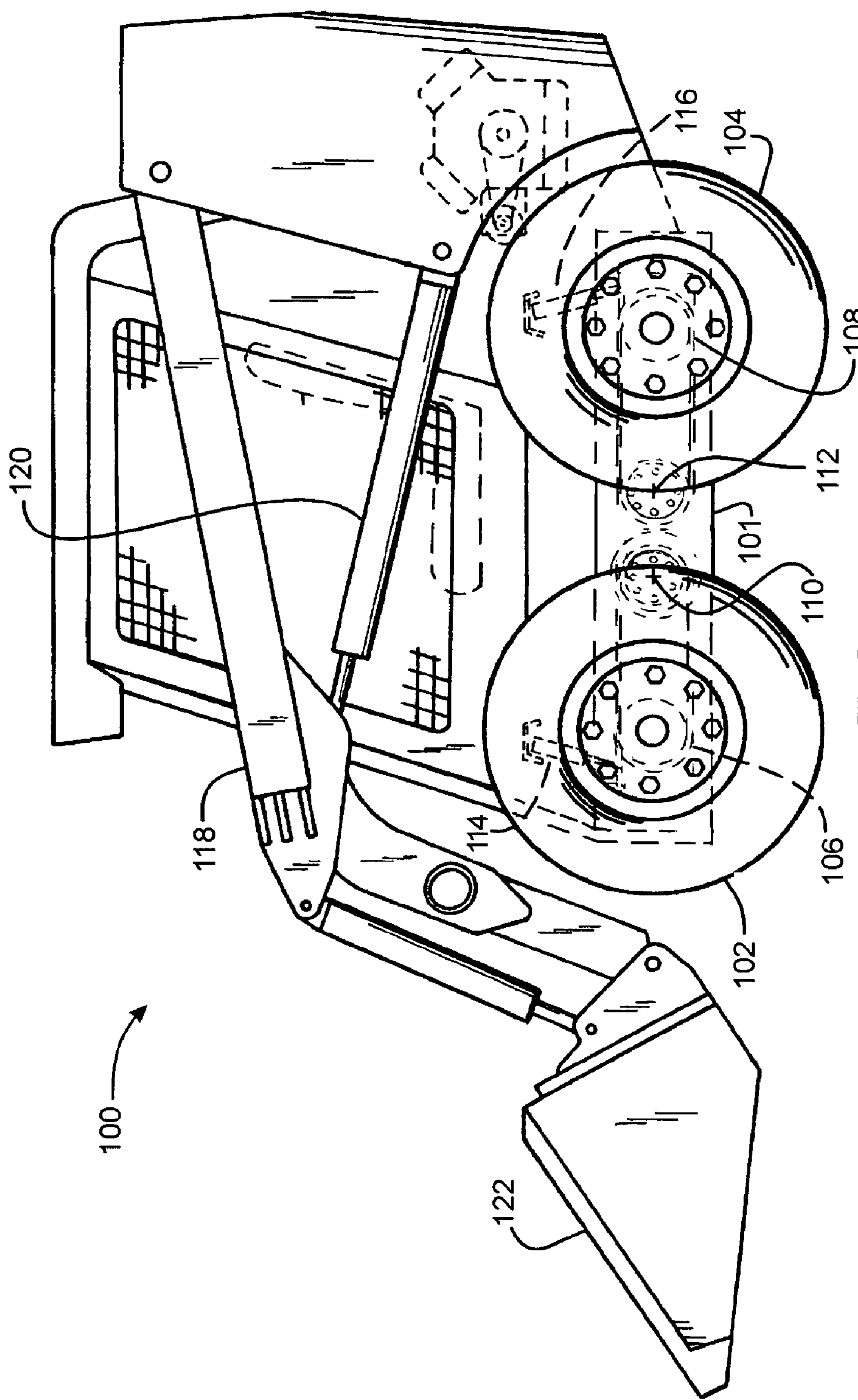
FIG. 1 is a side view of a skid steer vehicle in accordance with the present invention.

FIG. 1 shows the left side of a skid steer vehicle 100 having a chassis 101. The left side of vehicle 100 has two wheels 102, 104, that are coupled to a forwardly extending suspension control arm 106 and a rearwardly extending suspension control arm 108, respectively. The control arms are pivotally coupled to the chassis to pivot with respect thereto about parallel and laterally extending pivotal axes 110, 112. The left side of the vehicle also includes two hydraulic damping cylinders 114, 116, a loader lift arm 118, a loader lift arm cylinder 120, and a bucket 122. The loader lift arm cylinder 120 is coupled to and between loader lift arm 118 and chassis 101, to lift arm 118 and hence bucket 122 with respect to chassis 101. A second loader lift arm and loader lift arm cylinder may be provided on the other side of the vehicle in mirror relation to the arm and cylinder shown in FIG. 1.

Damping cylinder 114 is coupled to and between the free end of front control arm 106 and the vehicle chassis. In a similar arrangement, damping cylinder 116 is coupled to and between the free end of rear control arm 108 and the vehicle chassis. As the control arms pivot with respect to the chassis, the cylinders are configured to damp the oscillations and provide a smooth ride for the operator.

The damping cylinders may be pure hydraulic cylinders, or combine hydraulic and pneumatic elements. They may be configured just to act as dampers, or alternatively be configured to provide both springing and damping. In one configuration, the cylinders have an internal gas charge that provides the springing. In another configuration, the configuration shown in FIG. 2, they are coupled to a remote gas charged accumulator that provides hydraulic fluid under pressure. In another configuration they may not be connected or supplied with any gas charge and merely act as dampers.

FIG. 1 illustrates only one side of the skid steer vehicle. The right side (not shown) is a mirror arrangement of the left side. The right side has two right side control arms, wheels, and damping cylinders 202, 204 (FIG. 2) that are configured identically to those of the left side, as well as an identically arranged loader lift arm and loader lift arm cylinder.

The vehicle of FIG. 1 is a skid steer vehicle. It has four driven wheels, with the wheels on each side of the vehicle being configured to be independently driven in different directions and different speeds. To do this, skid steer vehicles have at least two engine driven hydraulic pumps, each pump driving a motor or motors that in turn drive both wheels on one side of the vehicle at the same speed and in the same direction. Thus, one pump drives the wheels on one side of the vehicle, and another pump independent of the first pump, drives the wheels on the other side of the vehicle. An example of this drive system can be seen in U.S. Pat. No. 6,718,244, which is incorporated herein by reference for all that it teaches.

Figure 2:
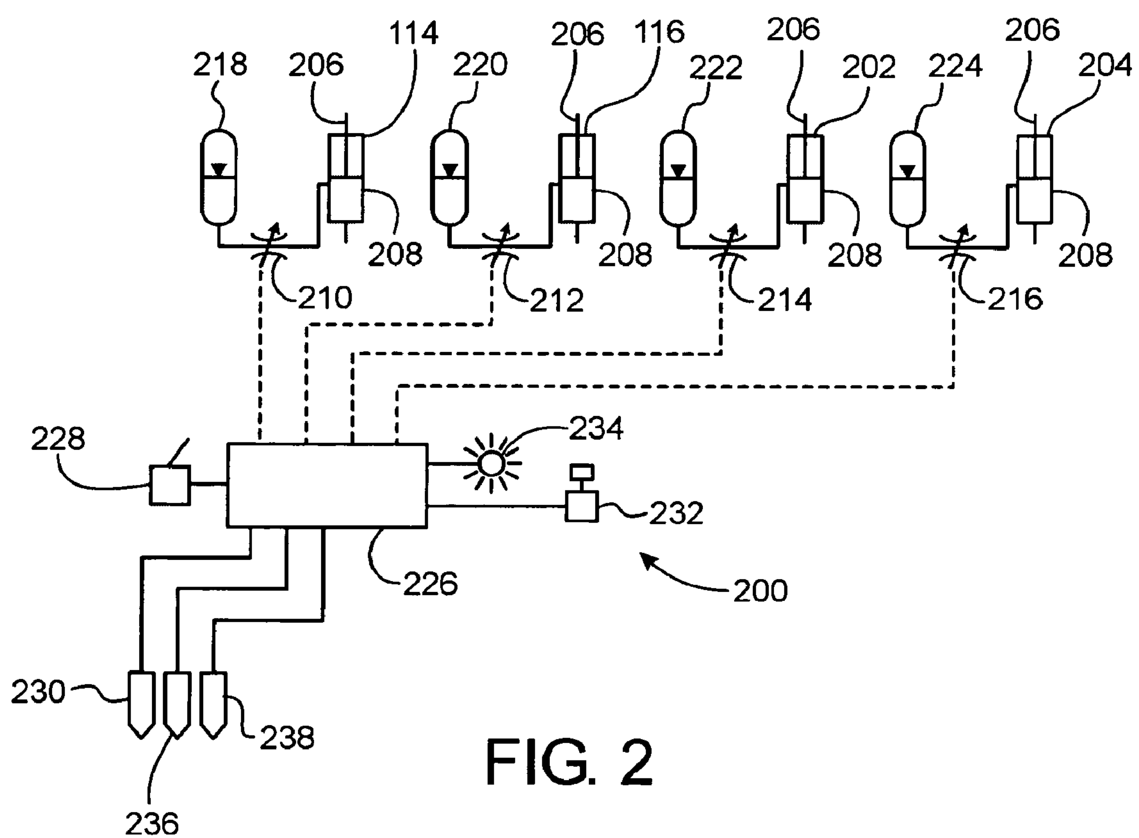
FIG. 2 is a simplified hydraulic schematic of the suspension circuit of the skid steer vehicle of FIG. 1 illustrating the automatic control of skid steer suspension damping.

FIG. 2 illustrates the hydraulic control system 200 for damping the motion of the vehicle's control arms. The system 200 includes left front hydraulic cylinder 114, left rear hydraulic cylinder 116, right front hydraulic cylinder 202, and right rear hydraulic cylinder 204. The system 200 also includes variable orifices 210, 212, 214, 216, gas-charged accumulators 218, 220, 222, 224, electronic controller 226, mode switch 228, position sensor 230, manually operable user input device 232, mode light 234, velocity sensor 236, and load sensor 238.

Each cylinder 114, 116, 202, 204 includes a rod portion 206 and a cylinder portion 208. The rod portion is coupled to one of the control arms and the chassis and the cylinder portion is connected to the other of the control arm and the chassis. When the control arm to which each cylinder is attached moves up and down, it moves the rod portion 206 within the cylinder, alternately pulling in or pushing out hydraulic fluid. When the hydraulic fluid flows to and from the cylinders, it passes through variable orifices 210, 212, 214, 216. These orifices are coupled to and between hydraulic fluid reservoirs (here shown as gas-charged accumulators 218, 220, 222, 224) and cylinders 114, 116, 202, 204, respectively.

Variable orifices 210, 212, 214, 216, are coupled to and controlled by electronic controller 226. Controller 226 is configured to control the degree of opening of the orifices under computer program control based upon several parameters of operation, including the speed of the vehicle, the load on the vehicle (in particular the bucket load) and the degree of oscillation of the suspension control arms. This process of reading the sensor signals and calculating the appropriate degree of closing of the variable orifices is discussed in more detail below with regard to Table 1 and FIG. 4.

Controller 226 is coupled to and receives signals from mode switch 228, position sensor 230, velocity sensor 236, load sensor 238, and manually operable user input device 232. Controller 226 is coupled to and controls a mode light 234.

Mode switch 228 is operable by the vehicle operator to select the mode of operation of controller 226. In one position, it signals controller 226 that the mode of operation is manual. In its other position, it signals controller 226 that the mode of operation is automatic.

Input device 232 is preferably a potentiometer, variable resistor, shaft encoder or similar digital or analog output device that can be rotated or moved by the vehicle operator. It preferably generates a signal proportional to its position and has several positions to provide for operator selection of several different levels of damping.

When the operator places the mode switch 228 into its "manual" position (i.e. a manual mode of operation), controller 226 is configured to respond to operator manipulation of input device 232 by varying the opening of variable orifices 210, 212, 214, 216.

In manual mode, the operator rotates input device 232 to select a desired degree of damping. Controller 226 is configured to receive the signal generated by input device 232 and to control the variable orifices thereby providing the corresponding amount of damping.

Controller 226 is configured by its internal program to turn on mode light 234 whenever the system 200 is in the automatic mode of operation. When the operator moves mode switch 232 back to its manual position, controller 226 extinguishes mode light 234.

Position sensor 230 is configured to generate a signal indicating the position of a control arm with respect to the chassis 101. In one embodiment, sensor 230 is a potentiometer or variable resistor coupled to and between one control arm and the chassis to sense movement of the control arm with respect to the chassis. In another embodiment it is a radar unit coupled to the chassis and disposed to sense the distance between the chassis and the ground. In another embodiment it is an LVDT that is coupled to and between the chassis and a control arm to sense the movement of the control arm with respect to the chassis. All of these embodiments of the position sensor provide a signal that is indicative of the movement of the control arm with respect to the chassis, either directly or indirectly.

Velocity sensor 236 is configured to generate a signal indicative of the speed of the vehicle. In one embodiment the sensor may be one or more speed sensors coupled to the vehicle's drive motors or wheels. In another embodiment, it may be a hydraulic fluid flow rate sensor (for vehicles in which the flow rate is related to the speed of the vehicle). In another embodiment it may be a swash plate position sensor (for vehicles in which the swash plate position of the pump is related to the speed of the vehicle). In another it may be connected to or a part of another microcontroller or microprocessor and may transmit its signal from that other microcontroller or microprocessor to microcontroller 300.

Load sensor 238 is configured to indicate the load on the vehicle 100. In this, the preferred embodiment load sensor 238 is a pressure sensor that is coupled to the loader lift arm cylinders to generate a signal indicative of the load in the skid steer bucket, which is related to the vehicle load. In another embodiment it may include one or more pressure sensors in fluid communication with one or more of hydraulic cylinders 114, 116, 202, 204.

Figure 3:
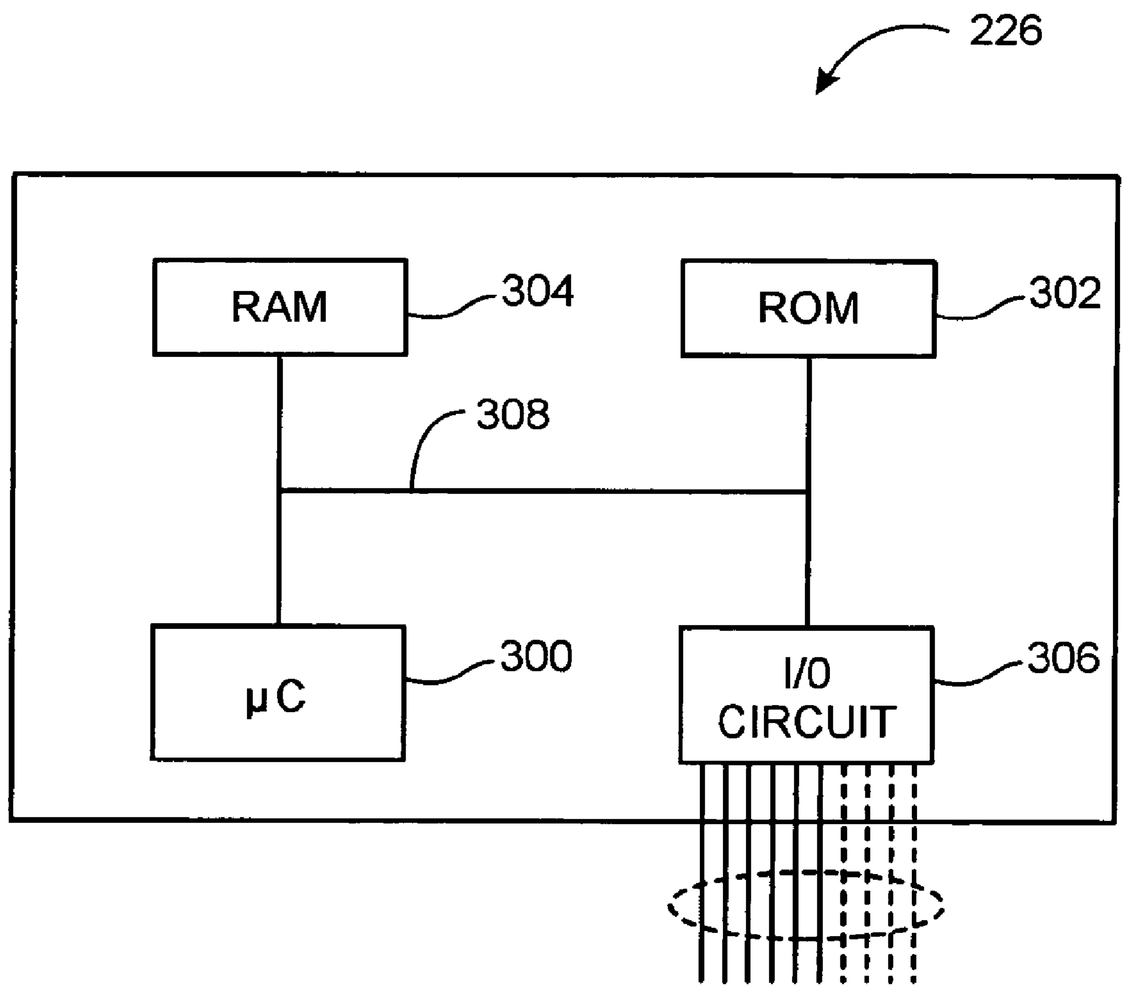
FIG. 3 is a detailed view of the electronic controller of FIG. 2.

FIG. 3 illustrates the configuration of controller 226, which includes a microprocessor or microcontroller 300 that is configured to execute stored instructions. These instructions are contained in read-only memory (ROM) 302. Controller 226 also includes a random access memory (RAM) 304 that is coupled to microcontroller 300. Random access memory 304 provides volatile memory space for storing dynamic data.

An input/output circuit 306 is provided to receive signals from the mode switch, the position sensor and the input device, to condition those signals and to provide them to the microcontroller 300 for further processing. The input/output circuit 306 is also configured to receive digital signals from the microcontroller 300 and to responsively drive the variable orifices and mode light. These signals are receive and sent on signal lines 308 which are coupled to and between the microcontroller 300 and the aforementioned devices.

Microcontroller 300, ROM 302, RAM 304 and input/output circuit 306 are coupled together by an address/data/control bus 308.

Figure 4:
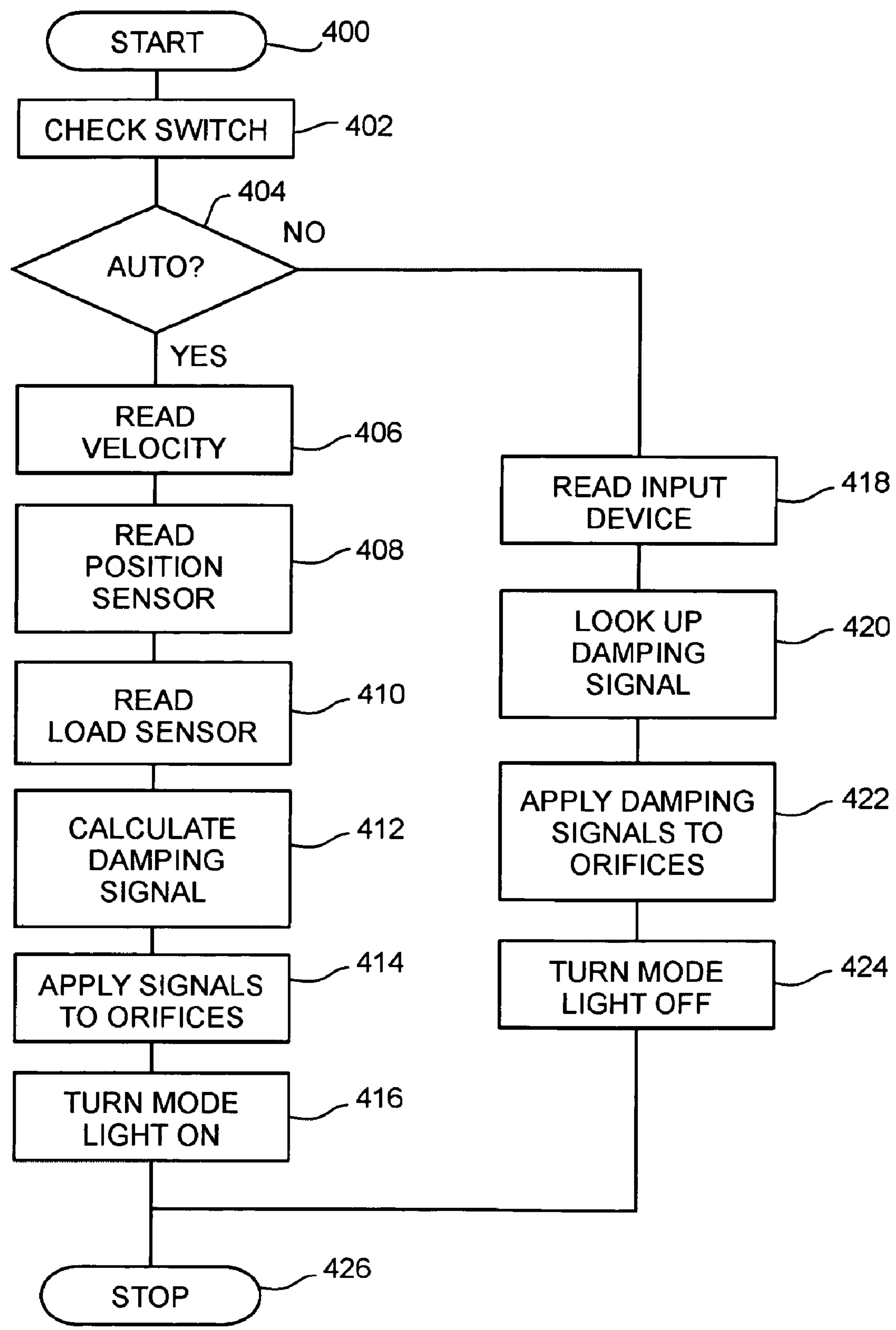
FIG. 4 is a flow chart illustrating the operation of the hydraulic damping circuit of FIGS. 2 and 3.

FIG. 4 is a flow chart showing the automatic and manual modes of operation of the system shown in FIGS. 1-3. It reflects the operation of microcontroller 300, the components which it monitors, and the components it drives.

In the preferred embodiment, the process shown in FIG. 4 is encoded as a series of digital electronic instructions that are stored in the ROM memory of controller 226. Microcontroller 300 sequentially retrieves these instructions from ROM memory 302 and executes them.

The process of monitoring the sensors and controlling the variable orifices that is performed by microcontroller 300 begins at step 400.

In step 402, microcontroller 300 receives a signal from switch 228 indicating the switch position. In step 404, microcontroller 300 examines the switch position signal it just received and determines whether the operator has placed the switch in its automatic mode position or in its manual mode position.

If the mode switch 228 is in its automatic mode position, microcontroller 300 continues to step 406 and determines the velocity of the vehicle from velocity sensor 236.

Microcontroller 300 then reads the signal from the position sensor 230 in step 408 to determine the position of the control arm 106.

Microcontroller 300 then reads the load sensor 238 in step 410 to determine a load on the vehicle, in this case, the bucket load.

Once it has read the position, the load and the velocity signals from the sensors, microcontroller 300 then uses the signal values to calculate in step 412 the degree to which variable orifices 210, 212, 214, and 216 should be closed.

Since the cylinders can only move by expelling hydraulic fluid from the variable orifices, an since the degree of closure of the variable orifices control the rate at which hydraulic fluid enters or leaves the cylinders, the degree of closure of the variable orifices determines how much damping the cylinders provide.

Referring now to Table 1, we can see illustrated in table form the relationship between the desired amount of damping of the damping cylinders (expressed as a percentage of closure of the variable orifices) versus the speed of the vehicle (derived from the velocity sensor) the load on the vehicle (derived from the lift arm cylinder pressure sensed by the load sensor) and the amount of suspension motion (derived from the position sensor signal). Each row in Table 1 corresponds to a programmed logical rule that is executed by microcontroller 300 each time it reads the three sensor signals.

For example, if we look at the second rule in Table 1 (i.e. the second row) we see that microcontroller 300 will close all the variable orifices down by 35% of their full open position whenever microcontroller 300 determines (1) that the speed of the vehicle is between 3 and 8 miles per hour, per column 1, (2) that the control arm 106 is moving in its central two inch range (+/−1 inches about its middle position), per column 3, and (3) that the pressure in the loader lift arm cylinders is between 0 and 1000 psi, per column 5. Whenever microcontroller 300 determines that these three conditions are met, microcontroller 300 is configured to apply the rule shown in column 7 of Table 1 and close the variable orifices by 35% (i.e. leaving them 65% open).

As another example, if we look at the last row of Table 1, we see that microcontroller 300 will close all the variable orifices down by 65% of their full open position whenever microcontroller 300 determines that (1) the speed of the vehicle is between 12 and 24 miles per hour, per column 1, (2) the control arm 106 is moving all the way up (+3 inches) or all the way down (−3 inches), per column 3, and (3) the pressure in the loader lift arm cylinder is between 2000 and its maximum operating pressure of 3000 psi, per column 5.

Columns 2, 4, and 6 are provided for illustration only, and show the effects of each condition on the total amount of orifice closing shown in column 7.

For example, when the skid steer moves at a speed of between 8 and 12 miles per hour the effect is to close the orifice by 10 percent.

As another example, the effect of a moderate load in the skid steer bucket—i.e. a load causing a loader lift arm cylinder pressure of 1000-2000 psi—causes microcontroller 300 to open the variable orifices by 10% ("−10" in Table 1), thus making the ride softer and permitting the suspensions to absorb more impacts. Similarly, whenever the control arm 106 moves more than 2 inches away from its center or neutral position as indicated by the position sensor 230, microcontroller 300 responds by closing the variable orifices 50%.

Each rule in Table 1 combines the effects of the vehicle speed, the vehicle suspension position, and the vehicle load to arrive at the percentage of closure shown in column 7. The percent closure of the orifices shown in column 7 is the sum of each of the three effects of speed, load and suspension position or movement.

microcontroller 300 configured to apply different rules, open the orifices, permit the control arms to pivot and the orifices to damp control arm movement.

The actual values and ranges shown in Table 1 are those appropriate for a preferred embodiment of the skid steer vehicle described herein. In the preferred embodiment, the loader lift arms have a working pressure limit of 3000 psi. Thus, the three pressure ranges of 0-1000, 1000-2000, and 2000-3000 psi in Table 1 represent low, medium and high load ranges on the skid steer. Vehicles with other hydraulic cylinder and pump arrangements may have different pressures. Alternative embodiments of the invention may sense loads in a different manner, such as by sensing the hydraulic pressure in one or more of the hydraulic cylinders shown herein, or the spring tension in suspension springs, or the position of the suspension itself if the suspension position is related to the load on the vehicle.

The same is true of the position signal provided by the position sensor. Other vehicles may have greater or lesser amounts of travel than the control arms of the present embodiment. While the present example shows a single position sensor, there may be two, three, four or even more position sensors all providing position information to the

TABLE 1

| Speed (mph) | Closure (%) | Suspension Motion | Closure (%) | Cylinder Press (psi) | Closure (%) | Total Orifice Closure (%) |
|---|---|---|---|---|---|---|
| 0-3 | | | | | | 100% |
| 3-8 | 5 | +/−1 inch | 30 | 0-1000 psi | 0 | 35% |
| 3-8 | 5 | +/−1 inch | 30 | 1000-2000 psi | −10 | 25% |
| 3-8 | 5 | +/−1 inch | 30 | 2000-3000 psi | −20 | 15% |
| 3-8 | 5 | +/−2 inches | 50 | 0-1000 psi | 0 | 55% |
| 3-8 | 5 | +/−2 inches | 50 | 1000-2000 psi | −10 | 45% |
| 3-8 | 5 | +/−2 inches | 50 | 2000-3000 psi | −20 | 35% |
| 3-8 | 5 | +/−3 inches | 70 | 0-1000 psi | 0 | 75% |
| 3-8 | 5 | +/−3 inches | 70 | 1000-2000 psi | −10 | 65% |
| 3-8 | 5 | +/−3 inches | 70 | 2000-3000 psi | −20 | 55% |
| 8-12 | 10 | +/−1 inch | 30 | 0-1000 psi | 0 | 40% |
| 8-12 | 10 | +/−1 inch | 30 | 1000-2000 psi | −10 | 30% |
| 8-12 | 10 | +/−1 inch | 30 | 2000-3000 psi | −20 | 20% |
| 8-12 | 10 | +/−2 inches | 50 | 0-1000 psi | 0 | 60% |
| 8-12 | 10 | +/−2 inches | 50 | 1000-2000 psi | −10 | 50% |
| 8-12 | 10 | +/−2 inches | 50 | 2000-3000 psi | −20 | 40% |
| 8-12 | 10 | +/−3 inches | 70 | 0-1000 psi | 0 | 80% |
| 8-12 | 10 | +/−3 inches | 70 | 1000-2000 psi | −10 | 70% |
| 8-12 | 10 | +/−3 inches | 70 | 2000-3000 psi | −20 | 60% |
| 12-24 | 15 | +/−1 inch | 30 | 0-1000 psi | 0 | 45% |
| 12-24 | 15 | +/−1 inch | 30 | 1000-2000 psi | −10 | 35% |
| 12-24 | 15 | +/−1 inch | 30 | 2000-3000 psi | −20 | 25% |
| 12-24 | 15 | +/−2 inches | 50 | 0-1000 psi | 0 | 65% |
| 12-24 | 15 | +/−2 inches | 50 | 1000-2000 psi | −10 | 55% |
| 12-24 | 15 | +/−2 inches | 50 | 2000-3000 psi | −20 | 45% |
| 12-24 | 15 | +/−3 inches | 70 | 0-1000 psi | 0 | 85% |
| 12-24 | 15 | +/−3 inches | 70 | 1000-2000 psi | −10 | 75% |
| 12-24 | 15 | +/−3 inches | 70 | 2000-3000 psi | −20 | 65% |

There is one rule that microcontroller follows that deserves further explanation—the rule shown in the first row of Table 1. Whenever microcontroller 300 determines that the skid steer speed is less than 3 miles per hour, microcontroller 300 is configured to lock the skid steer suspensions by closing all the variable orifices 100 percent. This prevents the skid steer control arms from pivoting with respect to the chassis and makes the skid steer operate like a traditional unsprung vehicle. It provides the stiffness and rigidity required for loading and unloading the bucket. Only when the skid steer starts moving at a speed greater than a predetermined speed (3 mph in the example of row 1) is microcontroller. They may have sensors mounted on one, two or even all the control arms or other suspension elements.

Referring back to FIG. 4 and the flowchart, the rules shown in Table 1 are kept in the ROM memory of controller 226, preferably in digital form as a lookup table. Alternatively, they may be maintained in the ROM memory as a series of equations that are calculated whenever step 412 is executed.

In step 412 of FIG. 4, microcontroller 300 compares the position signal, the load signal and the speed signal that it read in steps 406, 408 and 410 with the values shown in columns 1, 3, and 5 of Table 1 to determine how much to close the four variable orifices 210, 212, 214, 216.

Once it determines the degree of closing of the orifices, microcontroller 300 then applies the appropriate signal to the four orifices over signal lines 310, which extend from I/O circuit 306 (FIG. 3) and are coupled to each of the orifices 210, 212, 214, 216 in block 414. The orifices responsively close the commanded amount.

In step 416, microcontroller 300 turns the mode light on in order to illuminate its indicium "automatic". This indicates to the operator that the damping is being automatically varied in the automatic mode of operation and that the system will not respond to operator movement of input device 232.

This completes the description of the steps arranged on the left hand side of FIG. 4. To continue with our description we refer back to step 404.

If the mode switch 228 is not in the automatic mode position in step 404, microcontroller 300 will proceed to step 418 in which it reads the signal from user input device 232. In the preferred embodiment, each position of the input device corresponds to a different percentage of variable orifice closure, and hence a different degree of damping.

In step 420, microcontroller 300 determines the value of an orifice signal that corresponds to the signal from user input device 232. In the preferred embodiment, the orifice signal is stored in the ROM memory 302.

In step 422, microcontroller 300 applies this orifice signal to the input/output circuit 306, which in turn applies the signal to the variable orifices 210, 212, 214, 216. This causes the variable orifices to responsively change their degree of opening to the amount of opening indicated by user input device 232.

In step 424, microcontroller 300 turns the mode light off (if it is not already off), extinguishing the "automatic" indicum, thus indicating to the operator that the system is in the manual mode of operation and will respond to operator adjustment of input device 232.

In step 426 the process of FIG. 4 stops.

The process shown in steps 400-426 is automatically repeated at periodic intervals. These intervals are preferably less than a second, more preferably less than a half a second, even more preferably less than a tenth of a second in length, and most preferably less than a hundredth of a second in length.

A system for automatically controlling the damping of skid steer vehicle in both an automatic and a manual mode is provided. The system permits the operator to select a manual mode and select the desired damping of the skid steer vehicle. It also permits the operator to select an automatic mode and have the damping automatically varied based upon the speed, suspension or control arm position and load of the vehicle. The system monitors the position of the suspension, the vehicle load and the vehicle speed, and based upon these parameters, sets the damping of the suspension accordingly.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

We claim:

1. A skid steer vehicle with variable ride control system comprising:

a chassis;

four drive wheels pivotally coupled to the chassis by four control arms, located at the front and the rear of both the left and the right sides of the vehicle, wherein said left side wheels are configured to be driven independently from said right side wheels to skid steer the vehicle;

four hydraulic damping cylinders coupled to the chassis, wherein each cylinder is disposed to damp the movement of a corresponding one of the four drive wheels;

an electronic controller configured to automatically control the flow of fluid in the four hydraulic damping cylinders in a first automatic mode of operation and to permit the manual control of the flow of fluid on the four hydraulic damping cylinders in a second manual mode of operation;

a vehicle load sensor, a vehicle speed sensor and a vehicle suspension position sensor coupled to the electronic controller, wherein the electronic controller is configured to read the load, speed and position sensors and to generate a signal indicative of a desired degree of suspension damping therefrom; and four variable orifices coupled to the four hydraulic damping cylinders to throttle cylinder hydraulic fluid flow, and further wherein the electronic controller is configured to compare reference data stored in the electronic controller with the signals received from the load, speed, and position sensors in order to determine how much to close the orifice closure.

2. The skid steer vehicle of claim 1, further comprising:

an operator input device coupled to the electronic controller and responsive to operator manipulation to select a desired degree of damping for the four hydraulic damping cylinders.

3. The skid steer vehicle of claim 1, further comprising a manually operable mode switch coupled to the electronic controller, the controller being configured to responsively change the damping of the four hydraulic damping cylinders between an automatic mode and a manual mode.

4. The skid steer vehicle of claim 1, further comprising four gas-charged accumulators fluidly coupled to the four respective hydraulic damping cylinders, wherein the four variable orifices are disposed to throttle the flow of fluid therebetween.

5. A skid steer vehicle with a variable ride control system comprising:

a chassis;

four drive wheels mounted to the chassis and pivotable with respect thereto, with two drive wheels on each side of the chassis such that the wheels on each side can be driven independently of each other to skid steer the vehicle;

four hydraulic damping cylinders, each cylinder being coupled to the chassis to damp the motion of corresponding one of the four drive wheels; and an electronic controller configured to control fluid flow in the four cylinders in an automatic mode in response to vehicle speed, vehicle load and vehicle suspension position, and to control the damping in a manual mode in response to operator selection of a desired degree of damping, wherein the electronic controller is configured to throttle fluid flow through four orifices respectively coupled to the four hydraulic damping cylinders in response In the vehicle's speed, the load on the vehicle and the position of a suspension element, further wherein the electronic controller closes the orifices 100% when the electronic controller determines that the vehicle speed is 3 miles per hour or slower.

6. The skid steer vehicle of claim 5, further comprising sensors coupled to the electronic controller and configured to generate signals indicative of vehicle load, position and speed, and an operator input device coupled to the electronic controller to generate signals indicative of an operator's selected degree of damping.

7. The skid steer vehicle of claim 6, further comprising a means for switching operating modes between the automatic mode and the manual mode.

8. The skid steer vehicle of claim 5, wherein the vehicle further includes four control arms, including two forwardly extending control arms coupled to the chassis on opposing sides and two rearwardly extending control arms coupled to the chassis on opposing sides, wherein each of the control arms supports a corresponding one of the drive wheels.

9. The skid steer vehicle of claim 5, further comprising load, speed and position sensors, and further wherein the electronic controller is configured to read the load, speed and position sensors and to generate a signal indicating a desired orifice position therefrom.

10. A computer-implemented method of varying the ride of a skid steer vehicle comprising the steps of:

(a) in a first automatic mode of operation, (1) sensing a suspension position of the skid steer vehicle, (2) sensing a speed of the skid steer vehicle, (3) sensing a load on the skid steer vehicle, (4) comparing the second position, speed and load to reference data stored in a microcontroller of suspension damping, and (5) executing a programmed rule based on the reference data corresponding to the sensed position, speed and load in order to determine a degree of suspension damping; and (b) in a second manual mode of operation, (1) sensing an operator's manually selected desired degree of suspension damping, and (2) regulating the suspension component to provide the manually selected desired degree of suspension damping.

11. The computer-implemented method of claim 10, wherein the step or sensing a load includes the step of sensing a pressure in a hydraulic cylinder.

12. The computer-implemented method of claim 11, wherein the step of sensing a pressure in a hydraulic cylinder includes the step of sensing a pressure in a loader lift arm cylinder.

13. The computer-implemented method of claim 10, further comprising the step of:

automatically repeating the steps (1) through (5) of the first automatic mode of operation of claim 14 at periodic intervals.

14. The computer-implemented method of claim 13, wherein the periodic interval is less than a half a second.

* * * * *